United States Patent [19]

Kahn

[11] 4,018,996
[45] Apr. 19, 1977

[54] COMMUNICATION NETWORK PROTECTION SYSTEM

[76] Inventor: Leonard R. Kahn, 70 N. Grove St., Freeport, N.Y. 11520

[22] Filed: Feb. 13, 1976

[21] Appl. No.: 657,718

[52] U.S. Cl. .................................... 179/84 VF
[51] Int. Cl.² ...................................... H04M 1/50
[58] Field of Search .............. 179/84 VF, 84 R, 1 P, 179/1 D

[56] References Cited
UNITED STATES PATENTS

| | | | |
|---|---|---|---|
| 2,971,062 | 2/1961 | Salihi | 179/84 VF |
| 3,306,984 | 2/1967 | Leonard | 179/84 VF |
| 3,349,191 | 10/1967 | Mann | 179/84 VF |
| 3,394,226 | 7/1968 | Andrews | 179/1 D |

*Primary Examiner*—Kathleen H. Claffy
*Assistant Examiner*—Joseph A. Popek

[57] ABSTRACT

An improved system and method for protecting communications systems using in-band signaling from malfunction which may produce serious circuit failures such as false operation of the disconnect circuit.

Typical practice of the invention involves detection of those main signal sounds that are similar to and imitate the in-band control tones and using the detected sounds to control a switching circuit which inserts a band reject filter into the system so as to reduce the amplitude of such sounds before they are fed to the communication system utilizing in-band signaling.

Under normal conditions such sounds are not present or are of insufficient amplitude or are present for too short a time period to cause false operation. Accordingly, the band reject filter is not normally active and there is no degradation of frequency response. Even during those periods when the filter must be inserted in the line to provide protection, the bandwidth of the filter is narrow so that disturbance of the frequency response is minimized.

7 Claims, 1 Drawing Figure

COMMUNICATION NETWORK PROTECTION SYSTEM

BACKGROUND OF THE INVENTION

While the invention is subject to a number of different applications, it is especially suitable for use in telephone circuits which are used for the transmission of broadcast programs.

In many communications systems, supervisory circuits pass through the same facility as the desired intelligence. For example, in a telephone system certain tones may be sent over the telephone line so as to control various characteristics.

One important example of such operation is in normal dial telephone systems where a 2,600 Hz tone is sent through the line to disconnect the circuit. Unfortunately, certain types of voice and musical waves may confuse such circuitry and falsely operate the disconnect circuit. Sibilant sounds, such as S's and H's produce appreciable energy at 2,600 Hz which is a common frequency used for the line disconnect tone channel. For example, there have been reports of people in the clothing industry whose voices have repeatedly disconnected telephone circuits when they use the term "short sleeve shirts".

Also, there are systems that may be used over communications circuits which alter the spectral characteristics of speech, music and data and which may exasperate the problem. For example, some designs of devices described in U.S. Pat. No. 3,696,298 Kahn and Gordon, U.S. Pat. No. 3,684,838 Kahn, or my copending patent application Ser. No. 621,669 filed Oct. 14, 1975 may, under some conditions, increase the possibility of false operation of in-band signaling devices.

It is most important that when a telephone circuit is used for such transmission of news and sporting events, or for that matter any broadcast service, that the circuit not be interrupted or degraded. A sporting event which may be listened to by millions of people if interrupted at the wrong moment can create considerable consternation on the part of the listening public. More importantly, urgent messages regarding public safety should not suffer interruption and should be as reliable as possible. For this reason, special telephone circuits are often made available where the in-band circuit disconnect channelling equipment is removed from the line.

However, there are many instances where such lines are not available at a suitable cost or where it is impractical to make lines available at short notice. Under such situations normal dial lines equipped with in-band tone control circuits are used for transmission of broadcast programs and these lines are susceptible to false operation.

In the instant application means are provided for detecting the presence of speech sounds which imitate the control tone frequency and attenuating these sounds before they falsely operate the in-band signaling equipment. One embodiment of this invention provides a narrowband reject filter circuit which is normally bypassed but may be inserted in series with the telephone circuit when protection is required. This attenuating means is switched rapidly into the system when protection is required so that the tone control circuitry which is being protected does not have sufficient time to falsely operate. For example, if the tone operated in-band signalling system can operate if the proper frequency tone is fed to it for a 50 ms interval the protection circuit disclosed would insert the attenuating circuit into the system whenever components initiating the tone last for longer than say 30 ms. By this procedure, the control circuit would not operate falsely even though the spectrum characteristic of the speech or musical sound was of the proper characteristic to disturb the in-band signaling equipment.

When the speech sound which is capable of causing the false operation disappeared or drops sufficiently in amplitude to cause a false operation, the circuit attenuating the sound is removed so that the overall system frequency response is not degraded.

In some telephone circuits, band reject filters are permanently inserted in the telephone circuit so as to notch out or remove those portions of the main signal which may create false operation. Since these filters are present in the system permanently they cause some degradation of the frequency response of the line.

Also, an article recently appeared in the sound engineering publication "db" February, 1976 pp. 33 to 36 entitled "The Dynamic Control of Sibilant Sounds" by S. L. Silvers of the Telecommunications Section of the United Nations. This article describes a technique for reducing sibilant sounds which may be present for some speakers and which may be exaggerated when conventional volume compressors are used. The article describes a compressor with a frequency sensitive control circuit. The gain reduction is applied to the entire range of speech components whenever strong sibilant sounds are present. This avoids roll off of high frequency sounds. While such a technique is suitable for systems utilizing compressors and counteracts their poor sibilant sound performance it does alter the dynamic character of speech and music appreciably. Common carriers attempt to minimize processing of speech sounds because the subscriber should be allowed to select his own processing procedures and the common carrier system should have constant characteristics and with a minimal processing.

Furthermore, the sibilant sound control circuit is effective over a wide range of frequencies and therefore does not greatly attentuate any one specific narrowband of frequencies. Therefore, such a technique would not be fully effective against false activation of a narrow band tone channel.

In an article authored by Messrs. Weaver and Newell entitled "In-Band Single-Frequency Signalling", Bell Systems Technical Journal, November, 1954, pages 1309 to 1330, the authors describe the use of in-band signaling including circuits and methods for minimizing false keying by imitation tone components which are present in speech and other sounds. The authors discuss the following design factors which were employed to make the system relatively insensitive to the imitation signal tones:

1. A guard action whereby the energy is measured for nearly all of the frequencies in the voice band other than the narrowband centered on the signal frequency. This energy, which would be present under normal speech conditions but not when the in-band signal is present, is used to cancel or reduce the effect of an imitation signal component. Therefore, it materially decreases the sensitivity of the system to false control operation.

2. Employment of as narrow a bandwith as practical for the signal selective network. The use of a narrow bandwidth minimizes the possibility of an imitation signal falsely operating the circuit. Bandwidths in the range of 60 to 150 Hz are recommended.

3. The use of volume limiting to maintain a relatively constant level helps minimize loud talking from falsely operating the system.

4. The use of long operate times consistant with signaling requirements. The longer the operate time the less is the probability that normal speech sounds will imitate the signaling.

5. The use of the highest frequency that can be handled by the voice path for in-band signaling. Since the energy of voice or music falls off rapidly at high frequencies if a high frequency is selected for signaling, the imitation energy will be smaller and therefore will be less capable of falsely operating the signaling equipment.

All of these procedures can be used to greatly reduce the false alarm rate. Nevertheless, even when all of these procedures are utilized false alarms can and do occur often enough to be a problem. Furthermore, there are systems which are used with telephone circuits such as the system described in U.S. Pat. No. 3,684,838 where the spectral energy relationships are disturbed and it is possible that higher numbers of false alarms may be experienced.

SUMMARY OF THE INVENTION

The present invention substantially obviates one or more limitations and disadvantages of the described prior art arrangement. The present invention may also be used in conjunction with one or more of the prior art arrangements to provide improved performance. This invention discloses means and methods for avoiding false operation of control circuits in a communications system.

Another basic object, feature, and advantage of the invention is that it provides circuitry that does not degrade the frequency characteristic of a communications circuit under normal operating conditions but only alters the characteristic when necessary to avoid a catastrophic alteration of the communication circuit's characteristics.

These, and other objects, features, characteristics, and advantages of the systems and methods of the invention will be apparent from the following description of certain typical forms thereof taken together with the accompanying drawing.

DESCRIPTION OF THE PREFERRED EMBODIMENTS

Figure 1:
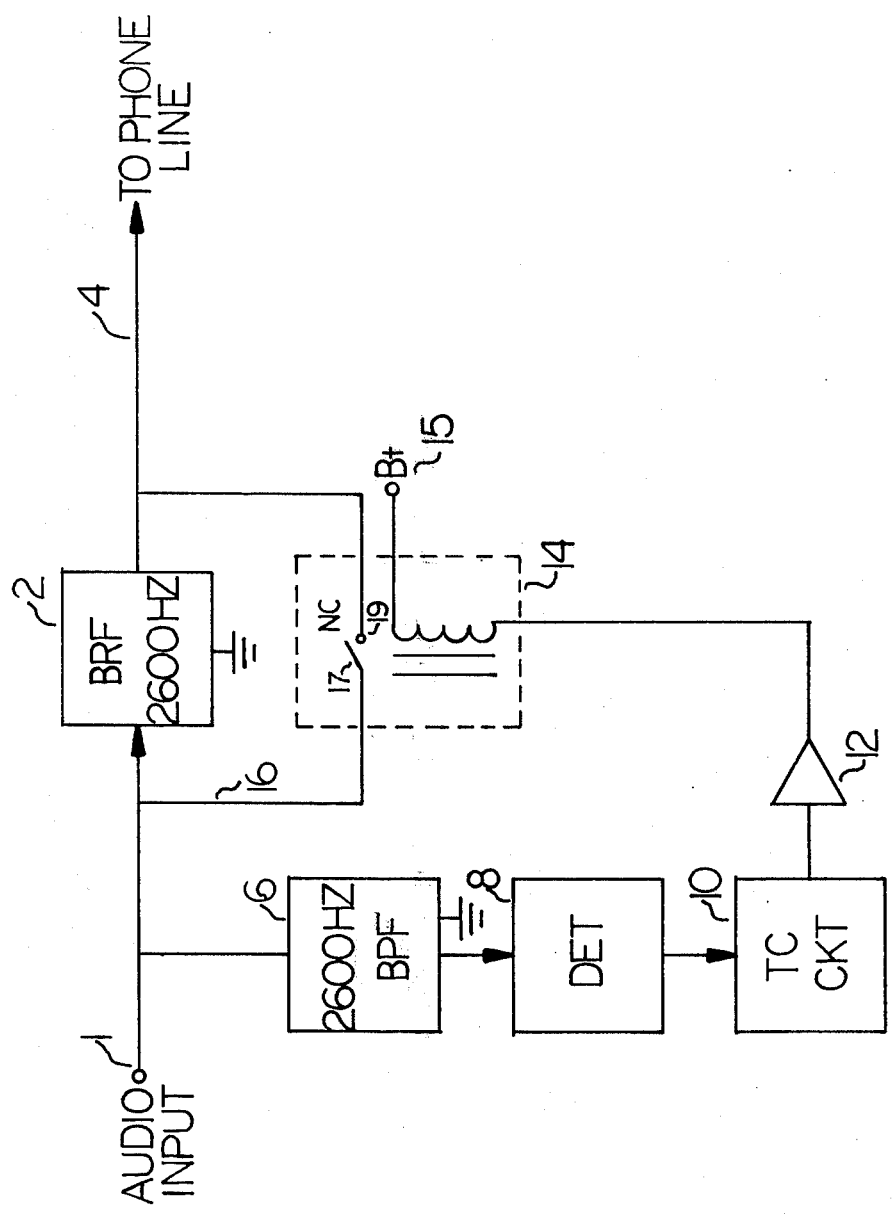
FIG. 1 is a Block Diagram showing one embodiment of the instant invention for protecting against false operation of a telephone disconnect circuit.

The sole FIGURE, FIG. 1, is a Block Diagram of one embodiment of the instant invention. The source of music, voice, or data information, audio input is fed through line 1 to a band reject filter, 2, which would typically be set to reject frequencies in the region of 2,600 Hz when protecting against false operation of the disconnect circuit. This filter, 2, is normally bypassed by action of relay, 14, which is normally closed connecting contact, 19, arm, 17, shorting circuiting filter, 2. Thus, under normal conditions the entire audio wave is fed to line 4, which connects to the associated telephone circuit.

When the audio input signal appearing on line 1 has a component at 2,600 Hz it passes through bandpass filter, 6, and is detected by detector 8. The output of the detector, 8, feeds a time constant circuit, 10, which is set so that the system responds somewhat more rapidly than the circuit incorporated in the telephone system. Accordingly, if the tone signaling equipment in the telephone system requires 50 milliseconds to operate the disable circuit, the TC circuit, 10, should cause the protection circuit to operate in say; for example, 30 milliseconds.

The output of the time constant circuit, 10, feeds an amplifier, 12, so that sufficient current from power source, 15, flows so as to operate relay, 14, and cause the arm of relay; i.e. 17 to disconnect from contact, 19, thus removing the short circuit across the band reject filter, 2, and inserting the 2,600 Hz filter in the line causing attenuation of the 2,600 Hz components of the audio input wave. Since these components have been removed in a period of time shorter than required for the tone operated circuitry in the disconnect system the telephone line will not falsely disconnect and the desired protection will be achieved.

Band reject filter, 6, should not be made too narrow because it must reject any component that passes within the bandpass of the tone signaling equipment being protected. Furthermore, allowance must be made for drift characteristics of the circuit so that under aging and changes in temperature and other environmental characteristics the band reject filter continues to protect the circuit. A band reject bandwidth in order of 150 Hz to 300 Hz is recommended. The bandpass filter, 6, should allow the system to respond to frequencies in the range of approximately 2,450 to 2,750 Hz for protection of the disconnect signaling system.

The time required to remove the band reject filter from the circuit is not critical. The TC circuit may also set this value. The value may vary from a few milliseconds to seconds. However, if the restoration time is too long, degradation of frequency response may be experienced.

In certain embodiments of this invention it is desirable, for economic reasons, to use band reject filter, 2, for more than one line. The fact that it is possible to share the use of the filter is due to the statistics of voice and music; i.e., the probability of the filter being in the circuit at any given instant of time is quite small. Therefore, assuming independent information is transmitted the probability of the filter being utilized simultaneously in two circuits is extremely small. Even if the intelligence is related; as it would be for the system described in U.S. Pat. No. 3,696,298, the 2,600 Hz components are not derived from the same input spectral components and the band reject filter might be switched between the two lines of the system according to the requirement at any given instant. This would require two separate sensing circuits and a switching circuit which would switch the band reject filter into the circuit requiring the protection at a given instant.

It should be noted that the band reject filter is not required to be placed into the line whenever a 2,600 Hz frequency component is present but only when the component is of sufficient amplitude and it is present for a sufficient period of time so as to imitate tone signaling. Therefore, this circuit, in contrast to the prior art, will provide protection with no meaningful deterioration of quality.

Much of the circuitry used in this invention is similar to the circuitry described in the above mentioned Weaver and Newell November, 1954 Bell System Technical Journal paper.

It is also possible to more closely simulate the in-band signaling equipment described in this paper by utilizing the techniques mentioned on Page 1314 for protecting the in-band signaling devices from waves which imitate the signaling tones including, for example, the use of guard action and volume limiting.

The advantage of using such techniques is that it would reduce the amount of time that the subject invention equipment operates so as to cause the insertion of the band reject filter in the communications path. However, this advantage must be weighed against the increased cost and complexity of incorporating such techniques.

Furthermore, since it is most difficult to discern a narrow cut in the frequency response of a communications system at 2,600 Hz when the circuit is used for transmission of speech and music, the false operations of this protection equipment is not of great moment. Certainly, it is of much less importance than false operation of the actual signaling equipment. Actually, if systems such as guard action are not used the protection system will tend to operate in marginal situations thus providing a greater degree of protection against false operation of the in-band signaling equipment. Therefore, it is believed that the preferred embodiment of this protection invention would not utilize the guard action and special volume limiting circuitry except for certain special applications of this invention such as possibly in the transmission of data.

From the foregoing, further variations and applications of the invention will be apparent to those skilled in the art to which the invention is addressed, within the scope of the following claims.

What is claimed is:

1. A method of protecting a communications channel equipped with in-band signaling from false operation by main signal components which imitate signaling tones comprising:
   a. sensing the presence of said components in the main signal which imitate the in-band signaling tone,
   b. determining whether the sensed tone components are present for a period of time exceeding a predetermined value which may falsely operate the in-band signaling equipment, and
   c. switching into the communication channel means for attenuating the signal components which imitate the in-band signaling tone when it is determined in Step (b) that the sensed tone components are present for a period exceeding the predetermined value.

2. The method, according to claim 1, wherein said predetermined time value is less than the time required for the shortest response in the protected in-band signaling equipment.

3. The method, according to claim 1, wherein the attenuating means is a narrow band reject filter.

4. The method, according to claim 1, wherein the frequency of the in-band tone is approximately 2,600 Hz.

5. In a communications system incorporating in-band signaling, a system for protecting the in-band signaling from false operation by components of the main signal comprising;
   a. means for sensing the presence of said components in the main signal,
   b. means connected to (a) means for determining if the duration of the sensed components exceeds a predetermined time period which may falsely operate the in-band signalling equipment; and,
   c. means connected to the (b) means for switching into the communications system means for attenuating the signal components in the main signal which imitate the in-band signaling tone if the sensed components are present for a time in excess of the said predetermined time period.

6. The system according to claim 5 where the predetermined time period is shorter than the operate time of the protected signaling equipment.

7. A system for protecting telephone systems which incorporate in-band 2,600 Hz tone activated disconnect circuits comprising; a bandpass filter centered at 2,600 Hz and connected to a detector circuit which detects the presence of signal components at approximately 2,600 Hz which in turn is connected to a time constant circuit, said time constant circuit adjusted so as to produce sufficient output to cause a switching circuit to operate if the detected 2,600 Hz components are present for a period of time exceeding approximately 30 milliseconds which may falsely operate the disconnect circuits, said switching circuit controlling a band reject filter centered at 2,600 Hz so as to insert the band reject filter into the telephone system whenever the switching circuit operates.

* * * * *